(12) United States Patent
Linkowski et al.

(10) Patent No.: US 12,090,665 B2
(45) Date of Patent: Sep. 17, 2024

(54) METHOD AND SYSTEM FOR POSITIONING SENSORS WITHIN A WORKSPACE

(71) Applicant: Ford Global Technologies, LLC, Dearborn, MI (US)

(72) Inventors: Gregory P. Linkowski, Dearborn, MI (US); Ling Zhu, Canton, MI (US); Meghna Menon, Rochester Hills, MI (US); Geoffrey Horowitz, Farmington Hills, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 17/231,392

(22) Filed: Apr. 15, 2021

(65) Prior Publication Data

US 2022/0339788 A1 Oct. 27, 2022

(51) Int. Cl.
*B25J 9/16* (2006.01)
*G01S 17/89* (2020.01)

(52) U.S. Cl.
CPC .......... *B25J 9/1666* (2013.01); *B25J 9/1697* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 6,148,100 A | 11/2000 | Anderson et al. | |
| 9,615,890 B2 | 4/2017 | Hwang et al. | |
| 2004/0263625 A1* | 12/2004 | Ishigami | G08B 13/19695 348/E7.086 |
| 2012/0039526 A1* | 2/2012 | Garaas | G08B 13/19641 382/154 |
| 2017/0076015 A1* | 3/2017 | Patel | G06F 30/18 |
| 2020/0073358 A1* | 3/2020 | Dedkov | B25J 9/1666 |
| 2020/0193686 A1* | 6/2020 | Chong | G06T 15/06 |
| 2020/0206928 A1 | 7/2020 | Denenberg et al. | |
| 2020/0363815 A1 | 11/2020 | Mousavian et al. | |
| 2020/0398430 A1 | 12/2020 | Mohan et al. | |
| 2021/0303745 A1* | 9/2021 | Linkowski | G06F 30/13 |

* cited by examiner

*Primary Examiner* — Jaime Figueroa
*Assistant Examiner* — Arslan Azhar
(74) *Attorney, Agent, or Firm* — Burris Law, PLLC (57) ABSTRACT

A method includes generating a workspace model having one or more digital robots, one or more digital sensors, and a digital transport system. The method includes simulating, for a task of the one or more digital robots, a sensor operation of the one or more digital sensors within the workspace model based on sensor characteristics of the one or more digital sensors. The method includes identifying, for the task of the one or more digital robots, an undetectable area within the workspace model based on the simulated sensor operation. The method includes selectively positioning, by a transport system, a set of sensors from among the one or more sensors based on the undetectable areas associated with the task.

20 Claims, 5 Drawing Sheets

METHOD AND SYSTEM FOR POSITIONING SENSORS WITHIN A WORKSPACE

FIELD

The present disclosure relates to a method and/or system for positioning one or more sensors within a workspace.

BACKGROUND

The statements in this section merely provide background information related to the present disclosure and may not constitute prior art.

A workspace can include one or more industrial robots that perform various automated tasks. Furthermore, the workspace may include one or more sensors configured to obtain image data of the workspace, thereby enabling a computing device and/or a robot controller to identify objects in the workspace. By identifying objects in the workspace, the industrial robot can accommodate the objects within the workspace while performing various automated tasks. However, undetectable zones within the workspace due to, for example, the limitations of the one or more sensors, placement of robots, and/or workspace configuration, among other factors, may prevent the industrial robot from accommodating the objects within the undetectable zones of the workspace.

These issues with the use of industrial robots in a manufacturing environment, among other issues with industrial robots, are addressed by the present disclosure.

SUMMARY

This section provides a general summary of the disclosure and is not a comprehensive disclosure of its full scope or all of its features.

The present disclosure provides a method for controlling a position of one or more sensors of a workspace including one or more robots. The method includes generating a workspace model having one or more digital robots, one or more digital sensors, and a digital transport system, where the workspace model is a digital model of the workspace, the one or more digital robots are digital models of the one or more robots, and the one or more digital sensors are digital models of the one or more sensors. The method includes simulating, for a task of the one or more digital robots, a sensor operation of the one or more digital sensors within the workspace model based on sensor characteristics of the one or more digital sensors, where the sensor characteristics includes an orientation of the digital sensors, a location of the digital sensors along the digital transport system, or a combination thereof. The method includes identifying, for the task of the one or more digital robots, an undetectable area within the workspace model based on the simulated sensor operation. The method includes selectively positioning, by a transport system, a set of sensors from among the one or more sensors based on the undetectable areas associated with the task, wherein the one or more sensors are operatively coupled to the transport system.

In some forms, selectively positioning the set of sensors further comprises moving the set of sensors along the transport system.

In some forms, selectively positioning the set of sensors further comprises rotating the set of sensors.

In some forms, the workspace further comprises one or more actuators attached to the set of sensors, and the one or more actuators are configured to rotate the set of sensors.

In some forms, the method further includes determining an aggregate undetectable area based on the undetectable areas associated with the task.

In some forms, the method further includes selectively positioning the set of sensors in response to the aggregate undetectable area not satisfying a detection metric.

In some forms, the method further includes determining whether the aggregate undetectable area corresponds to a Pareto optimal state.

In some forms, the set of sensors are selectively positioned such that the undetectable area corresponds to the Pareto optimal state.

In some forms, the undetectable area within the workspace model is identified based on a plurality of voxels representing the workspace model.

In some forms, the method further includes generating a depth map based on the simulated sensor operation and the plurality of voxels, where the undetectable area within the workspace model is determined based on one or more values of the depth map, and where each of the one or more values of the depth map is associated with one of the one or more voxels.

In some forms, the undetectable area within the workspace model is determined in response to the one or more values of the depth map being less than a threshold depth value.

In some forms, the method further includes determining an aggregate undetectable area based on the undetectable areas associated with the task, and determining whether the aggregate undetectable area satisfies a detection metric based on a multi-objective optimization routine, where the set of sensors are selectively positioned along the transport system in response to the aggregate undetectable area not satisfying the detection metric.

In some forms, the transport system is configured to move the set of sensors in a two-dimensional space of the workspace, a three-dimensional space of the workspace, or a combination thereof.

The present disclosure provides a system for controlling a position of one or more sensors of a workspace including one or more robots. The system includes a processor and a nontransitory computer-readable medium including instructions that are executable by the processor. The instructions include generating a workspace model having one or more digital robots, one or more digital sensors, and a digital transport system, where the workspace model is a digital model of the workspace, the one or more digital robots are digital models of the one or more robots, and the one or more digital sensors are digital models of the one or more sensors. The instructions include simulating, for a task of the one or more digital robots, a sensor operation of the one or more digital sensors within the workspace model based on sensor characteristics of the one or more digital sensors, where the sensor characteristics includes an orientation of the digital sensors, a location of the digital sensors along the digital transport system, or a combination thereof. The instructions include identifying, for the task of the one or more digital robots, an undetectable area within the workspace model based on the simulated sensor operation. The instructions include broadcasting a command to selectively position, by a transport system, a set of sensors from among the one or more sensors based on the undetectable areas associated with the task, where the one or more sensors are operatively coupled to the transport system.

In some forms, the instructions further include determining an aggregate undetectable area based on the undetectable areas associated with each of the one or more tasks, determining whether the aggregate undetectable area corresponds to a Pareto optimal state, and broadcasting a command to move the set of sensors such that the undetectable area corresponds to the Pareto optimal state.

In some forms, the instructions further include determining an aggregate undetectable area based on the undetectable areas associated with the task, determining whether the aggregate undetectable area satisfies a detection metric based on a multi-objective optimization routine, and broadcasting a command to move the set of sensors along the transport system in response to the aggregate undetectable area not satisfying the detection metric.

In some forms, selectively positioning the set of sensors further comprises moving the set of sensors along the transport system, rotating the set of sensors, or a combination thereof.

In some forms, the transport system is configured to move the set of sensors in a two-dimensional space of the workspace, a three-dimensional space of the workspace, or a combination thereof.

The present disclosure provides a method for controlling a position of one or more sensors of a workspace including one or more robots. The method includes generating a workspace model having one or more digital robots, one or more digital sensors, and a digital transport system, where the workspace model is a digital model of the workspace, wherein the one or more digital robots are digital models of the one or more robots, and where the one or more digital sensors are digital models of the one or more sensors. The method includes defining one or more tasks of the one or more digital robots and defining sensor characteristics of the one or more digital sensors, where the sensor characteristics includes an orientation of the digital sensors, a location of the digital sensors along the digital transport system, or a combination thereof. The method includes, for each of the one or more tasks: simulating a sensor operation of the one or more digital sensors within the workspace model based on the sensor characteristics, identifying an undetectable area within the workspace model based on the simulated sensor operation, determining an aggregate undetectable area based on the undetectable areas associated with each of the one or more tasks, and determining whether the aggregate undetectable area satisfies a detection metric based on a multi-objective optimization routine. The method includes selectively positioning, by a transport system, a set of sensors from among the one or more sensors in response to the aggregate undetectable area not satisfying the detection metric, where the one or more sensors are operatively coupled to the transport system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for a sensor placement computing system that optimizes sensor coverage of a workspace. The sensor placement computing system may generate a digital model of the workspace and define tasks of one or more robots and sensor characteristics of sensors. For each of the tasks, the sensor placement computing system simulates the sensor operation and identify undetectable zones within the workspace. Subsequently, the sensor placement computing system optimizes the sensor layout of the workspace to reduce undetectable areas by, for example, adjusting position and/or orientation of the sensors based on the undetectable areas associated with each task.

Figure 1:
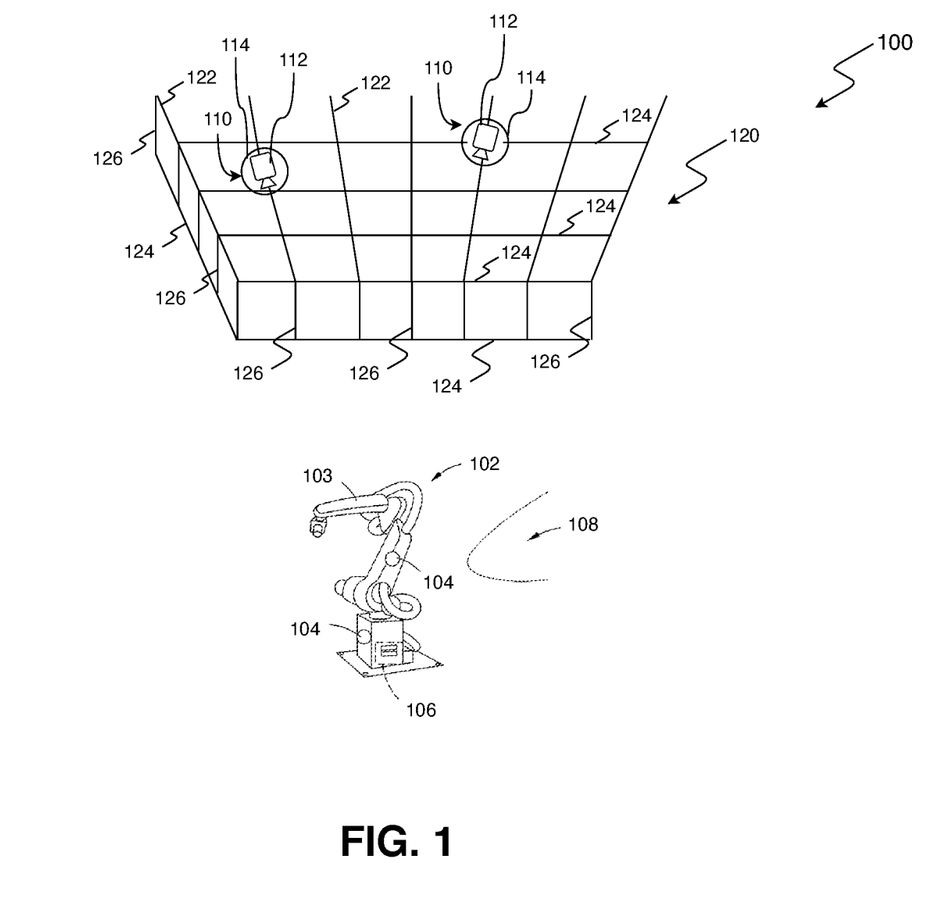
FIG. 1 illustrates a workspace in accordance with the teachings of the present disclosure.

Referring to FIG. 1, a system includes a workspace, generally referenced by reference number 100, in a manufacturing facility and a robot 102 within the workspace 100. The workspace 100 may be an uncaged area or a caged area having a fence or other containment-like structure. The workspace 100 may also be a mobile platform configured to move to various parts of the manufacturing facility.

In one form, the robot 102 includes a robotic arm 103 with varying range of motion and a robot controller 106 configured to operate the robotic arm 103 to perform one or more automated tasks. As an example, the robot controller 106 may control the robotic arm 103 to pick-up and move a workpiece (not shown) from a staging area to a processing area. While the robot 102 is illustrated as a stationary robotic arm, the robot may be any other suitable robot and should not be limited to the robot 102 illustrated in the figure. For example, the robot 102 may be a mobile robot. While FIG. 1 illustrates one robot 102, it should be understood that any number of robots 102 may be provided within the workspace 100 in other forms and that the robots 102 may be different from one another.

In one form, the robot 102 includes one or more robot sensors 104 to generate data corresponding to various operating metrics of the robot 102. As an example, the robot sensors 104 may include a location sensor (e.g., a near-field communication (NFC) sensor, an ultrawide-band (UWB) sensor) configured to generate location information of the robot 102. As another example, the robot sensors 104 may include an accelerometer, a gyroscope, and/or a magnetometer configured to generate orientation information of the robot 102. As yet another example, the robot sensors 104 may include a velocity sensor configured to generate velocity information of the robot 102, a power sensor to generate power information (e.g., information regarding amount of current and/or voltage being applied by a power source to the robot 102), a torque sensor configured to generate torque information of various joints of the robot 102, and/or a touch sensor at a handle of the robot 102 configured to detect contact. The robot sensors 104 are configured to provide the information to the robot controller 106 for further processing and for controlling the robotic arm 103. While specific examples are provided herein, the robot 102 may include other sensors and should not be limited to the sensors described herein.

To monitor the robot 102, the workspace 100 includes sensing devices 110 positioned at various locations within the workspace 100. In one form, the sensing devices 110 include sensors 112 configured to obtain images, data representing objects of the workspace 100, and/or the like. As an example, the sensors 112 include, but are not limited to: a two-dimensional camera, a three-dimensional camera, an infrared sensor, a radar scanner, a laser scanner, a light detection and ranging (LIDAR) sensor, and/or an ultrasonic sensor. As described below in further detail, a computing system in communication with the robot 102 and the sensors 112 uses the data from the sensors 112 to form a digital model of the workspace 100 and identify undetectable areas, such as dashed areas 108 within the workspace 100.

To support and control position of one or more of the sensing devices 110, the workspace 100 includes a transport system 120. In one form, the sensing devices 110 are arranged along the transport system 120 and are configured to move to various locations of the transport system 120 using actuators, which are generally represented as circle 114. In one form, the actuators 114 are configured to adjust the orientation (e.g., a pitch, yaw, etc.) of the sensors 112 and include motor drivers, motor controllers, transceivers, and/or other suitable hardware components for performing the functionality described herein. In one variation, the transport system 120 is moveable to various locations of the workspace 100. Accordingly, the sensing devices 110 are moveable to various 2D or 3D positions of the workspace 100, as described below in further detail.

In one form, the transport system 120 is implemented by rails, pulley systems, elevator platforms, mobile robots, and/or vehicles (e.g., automated guided vehicles (AGVs), autonomous vehicles, unmanned aerial vehicles, etc.) that move the sensing devices 110 and/or enable the sensing devices 110 to move to various 2D or 3D locations within the workspace 100. In some forms, the transport system 120 includes various movement systems (e.g., propulsion systems, steering systems, and/or brake systems) to move the sensing devices 110 and one or more processor circuits that are configured to execute machine-readable instructions stored in one or more nontransitory computer-readable mediums, such as a random-access memory (RAM) circuit and/or read-only memory (ROM) circuit. The transport system 120 may also include other components for performing the operations described herein, such as, but not limited to, movement drivers and systems, transceivers, routers, and/or input/output interface hardware.

In one form, the transport system 120 includes longitudinal transport systems 122, lateral transport systems 124, and vertical transport systems 126. The longitudinal transport systems 122 are configured to longitudinally (i.e., in the ±Y direction) move the sensing devices 110, the lateral transport systems 124 are configured to laterally (i.e., in the ±X direction) move the sensing devices 110, and the vertical transport systems 126 are configured to vertically (i.e., in the ±Z direction) move the sensing devices 110. The longitudinal transport systems 122, the lateral transport systems 124, and the vertical transport systems 126 may provide a path in which the sensing devices 110 move within the workspace 100. While the transport system 120 is shown as disposed above the robot 102, it should be understood that the transport system 120 can be positioned at any location within the workspace 100.

Figure 2:
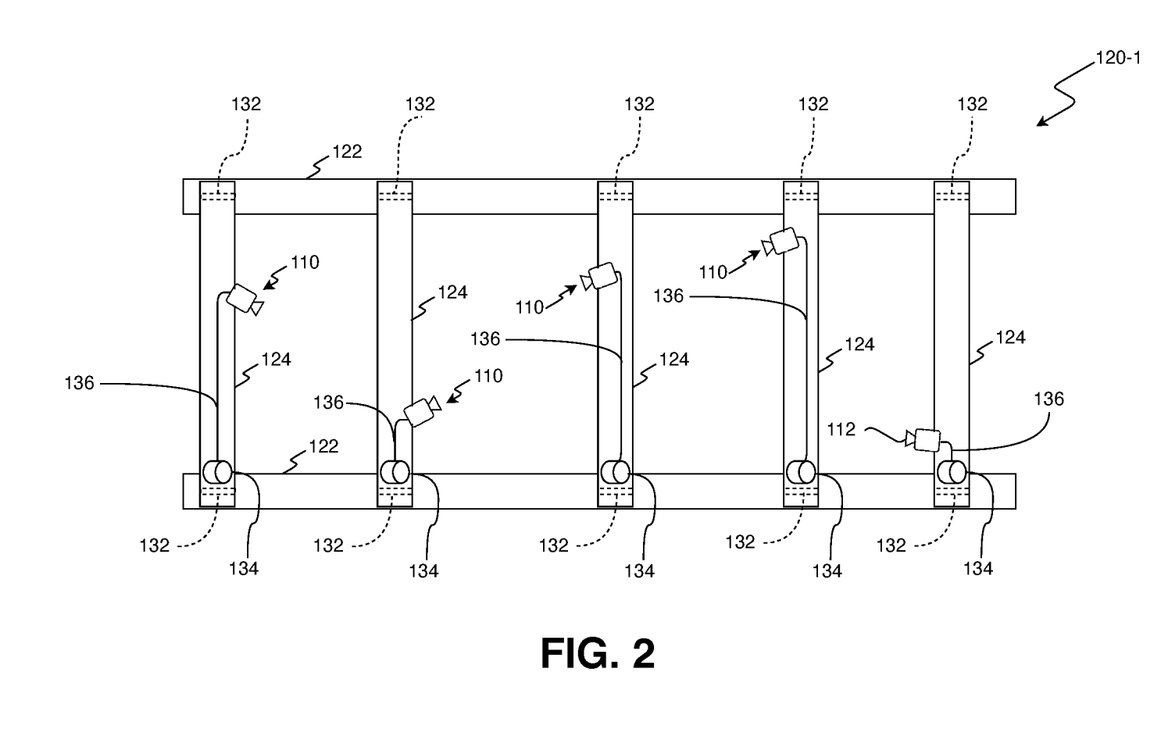
FIG. 2 illustrates a transport system in accordance with the present teachings of the present disclosure.

As an example and as shown in FIG. 2, a transport system 120-1 includes the longitudinal transport systems 122 and the lateral transport systems 124, which are implemented by rails. Using wheels 132, the lateral transport systems 124 is configured to move along tracks (not shown) disposed on longitudinal transport systems 122, thereby moving the sensing devices 110 disposed thereon. Furthermore, the sensing devices 110 are configured to move along the lateral transport systems 124 using pulleys 134 and cables 136 disposed on the lateral transport systems 124.

Figure 3:
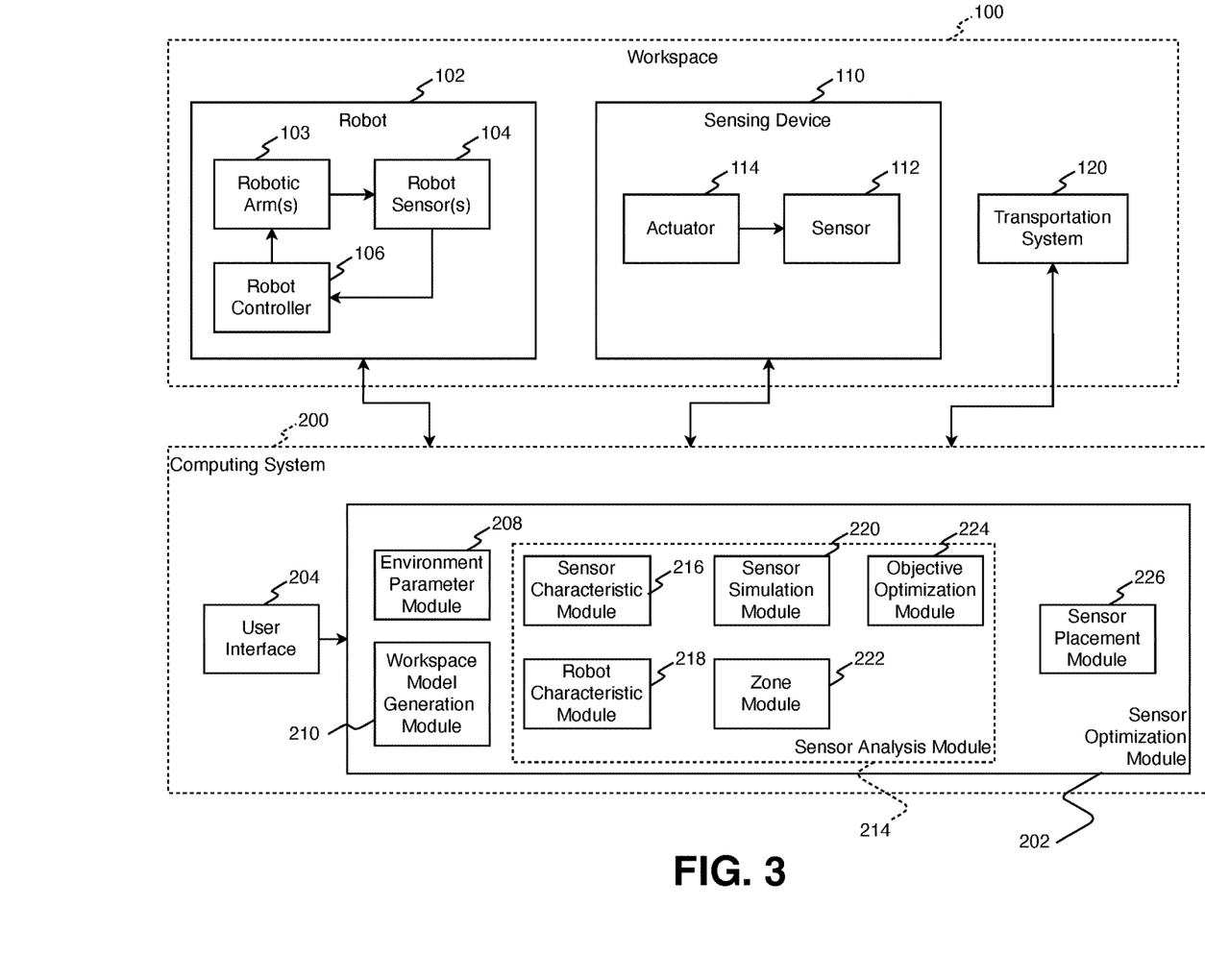
FIG. 3 is a functional block diagram of a sensor placement computing system in accordance with the teachings of the present disclosure.

Referring to FIG. 3, a computing system 200 is communicatively coupled to the robot controller 106, the sensing devices 110, and the transport system by way of an area network, a dedicated communication link, or a combination thereof. Accordingly, the computing system 200, the sensing devices 110, the robot controller 106, and the transport system 120 each include hardware components to establish the communication link in accordance with a communication protocol, such as a wired communication protocol and/or wireless communication protocol (e.g., Bluetooth-type protocol, Zigbee-type protocol, wireless fidelity (Wi-Fi)-type protocol, ultrawide-band (UWB)-type protocol, near-field communication (NFC)-type protocol, and cellular-type protocols, among others). In some forms, the hardware components of the computing system 200, the robot controller 106, the sensing devices 110, and the transport system 120 include, but are not limited to, transceivers, routers, input/output ports, and software executable by one or more processors.

The robot controller 106 includes computer-readable software programs that are executed by one or more processors of the robot controller 106. As an example, the robot controller 106 includes computer-software programs that include programs, when executed by the robot controller 106, that instruct the robot 102 to perform predefined automated tasks in which the robot 102 performs one or more motions to achieve a desired result. In some forms, the robot controller 106 includes computer-software programs that, when executed by the robot controller 106, obtains and processes the sensor data from the robot sensors 104 to monitor operations of the robotic arm 103.

In one form, the computing system 200 includes a sensor optimization module 202 and a user interface 204. The sensor optimization module 202 includes computer-readable software programs that are executable by the one or more processors of the computing system 200. Accordingly, the computing system 200 may include a microprocessor(s), a memory for storing code executed by the microprocessor(s), and other suitable hardware components to provide the described functionality of the computing system 200. In some forms, the sensor optimization module 202 includes an environment parameter module 208, a workspace model generation module 210, and a sensor analysis module 214.

The environment parameter module 208 is configured to identify and/or obtain various operating parameters of the workspace 100. In one form, the operating parameters of the workspace 100 include, but are not limited to: a 2D/3D operating range of the robot 102, a size of the robot 102, a type of robot 102 (e.g., a cartesian robot, a cylindrical robot, a spherical robot, a parallel robot, an articulated robot, among others), a degree of freedom of the robot 102, and/or the dimensions of a mobile platform in which the workspace 100 is provided. The operating parameters of the workspace 100 may be obtained from the robot controller 106 and/or inputted by a user using the user interface 204, which may include at least one of a touchscreen display, a microphone, buttons, barcode scanners, among other interfaces exchanging data/information with the computing system 200.

The workspace model generation module 210 is configured to generate a digital model of the workspace 100 based on a virtual representation of the workspace 100. As an example and referring to FIG. 4, the workspace model generation module 210 is configured to generate a voxelization representation of the workspace 100 having three of the robots 102 as the digital model. The voxelization representation is provided herein as voxelization 100' and includes voxels 101'. In some forms, the voxelization 100' may define boundaries of the workspace 100 and include digital representations of various objects of the workspace 100, such as a digital representation of the robot 102 (hereinafter referred to as robot 102'), a digital representation of the sensing devices 110 (hereinafter referred to as sensing devices 110'), and/or a digital representation of the transport system 120 (hereinafter referred to as transport system 120').

Figure 4:
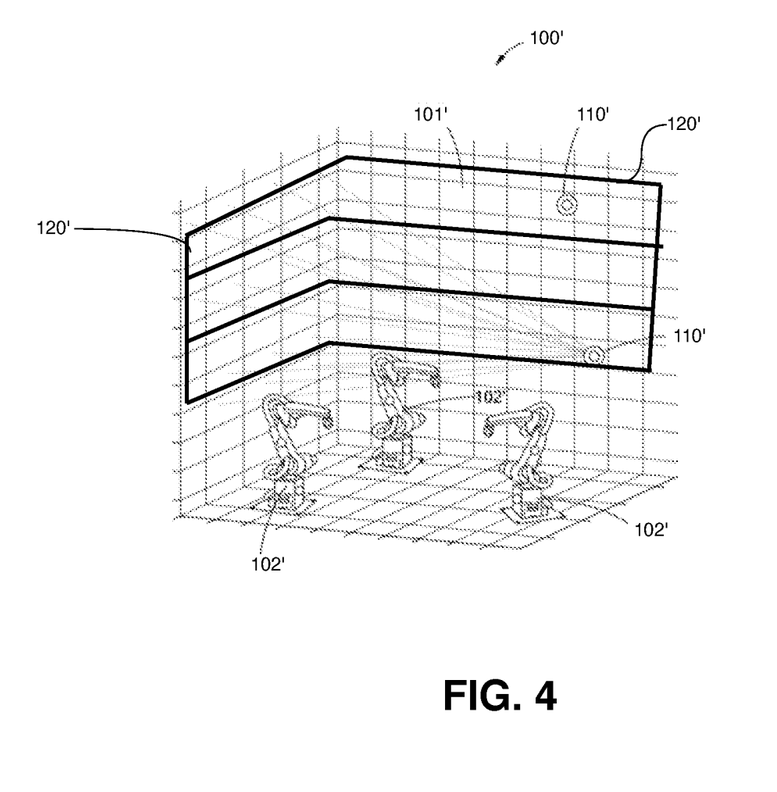
FIG. 4 is a digital representation of the workspace in accordance with the teachings of the present disclosure.

It should be understood that the voxelization 100' may include digital representations of other objects in the workspace 100, such as a human, a moveable object (e.g., an AGV, an autonomous mobile robot (AMR), a workpiece, a power tool, fasteners, among others), and/or a static object (e.g., workbench, table, human machine interface, among others). It should also be understood that the workspace model generation module 210 may generate other discrete grid models as the digital model and is not limited to the voxelization 100' described herein.

In some forms, the virtual representation may be predetermined and stored in the computing system 200 (e.g., stored in a database of the computing system 200). Furthermore, if new features are added to the workspace 100, the virtual representation may also be updated and stored in the computing system 200. In one form, the virtual representation is a computer aided design (CAD) drawing/modeling of the workspace 100, the robots 102, the sensing devices 110, and the transport system 120 within the workspace 100. As another example, the virtual representation is a model where modeled components can be moved (e.g., a modeled component indicative of the robot 102 being configured according to joint angles measured by the built-in encoders).

In some forms, the workspace model generation module 210 is configured to generate the voxelization 100' based on the operating parameters, the virtual representation, and/or the sensor data from the sensing devices 110. That is, when the sensing devices 110 include one or more multidimensional cameras (e.g., 2D or 3D cameras), the workspace model generation module 210 performs a spatial transformation of the data from the cameras. Using the virtual representation, the workspace model generation module 210 performs a mapping function that defines a spatial correspondence between all points in an image with the virtual representation. Example spatial transformation techniques for digital image processing include, but are not limited to, a checkerboard, QR-Code style artifact, among others, and the spatial transformation techniques can be used to calibrate extrinsic characteristics, (e.g., the pose of the sensing devices 110). With the extrinsic characteristics, various known algorithms can be used to position the recorded data in the real world (i.e., to convert from the camera frame to the world frame).

In some forms, the workspace model generation module 210 is configured to identify and classify objects provided in the voxelization 100'. As an example, the workspace model generation module 210 identifies and classifies the objects of the voxelization 100' based on an object classification library, which associates a plurality of objects with one or more classifications. The classifications may include, but are not limited to: the robot 102, the sensing devices 110, the transport systems 120, the robot sensors 104, a human, a moveable object, and/or a static object.

In some forms, the sensor analysis module 214 includes a sensor characteristic module 216, a robot characteristic module 218, a sensor simulation module 220, a zone module 222, an objective optimization module 224, and a sensor placement module 226. The sensor characteristic module 216 is configured to define sensor characteristics of the sensing devices 110', such as, but not limited to: a sensor type, an orientation, a field of view, and/or a location. In one form, the sensor characteristics may be inputted by a user of the computing system 200 via the user interface 204. In another form, the sensor characteristics may be predetermined and selected from a repository (e.g., a database). In yet another form, the sensor characteristics may be obtained from the sensing devices 110 of the workspace 100.

The robot characteristic module 218 is configured to define robot characteristics of the robot 102' (or the robot 102) when performing a given task. In one form, the robot characteristics include spatial-related parameters, which may include a location of the robot 102' and/or various poses of the robot 102' when performing the given task. The robot characteristics may be inputted by a user of the computing system 200 via the user interface 204 and/or obtained from the robot controller 106. In another form, the robot characteristics may be predetermined and selected from a repository (e.g., a database).

When the sensor characteristics and/or the robot characteristics are defined, the sensor simulation module 220 is configured to generate a simulation of the operation of the sensing devices 110' and/or the robot 102'. During (or after) the simulation, the zone module 222 is configured to identify an undetectable zone within the voxelization 100'. As referred to herein, the phrase "undetectable zone" refers to a zone in which the sensing devices 110' are unable to obtain sensor data based on, for example, the sensor characteristics and/or presence of objects in the voxelization 100'. In addition to identifying an undetectable zone within the voxelization 100', the undetectable zone module 222 may identify other zones of the voxelization 100', such as a detectable zone and/or an out-of-sight zone. As referred to herein, the phrase "detectable zone" refers to a zone in which the sensing devices 110' (or sensing devices 110) are able to obtain image data of the voxelization 100' (or the workspace 100). As referred to herein, the phrase "out-of-sight zone" refers to a zone which is outside of the field of view of the sensing devices 110' (or sensing devices 110).

To identify the undetectable zones, the zone module 222 generates a depth map based on the simulated sensor operation and the plurality of voxels 101'. In one form, each depth value of the depth map is determined based on the field of view of the sensing devices 110' and whether a given combination of pose scenarios of the robots 102' is within the field of view of the sensing devices 110'. As an example, the zone module 222 initially determines the location of each voxel 101' in a world frame and determines, for each voxel 101', the depth map value based on a rotation and/or translation matrix of each sensing devices 110' in the world frame and a pitch and/or yaw of the voxel 101' based on an origin of the sensing devices 110' in the world frame. If the given combination of pose scenario of the robots 102' is within the field of view of the sensing devices 110', the depth value in the corresponding region of the depth map may be less than a threshold value. If the given combination of pose scenario of the robots 102' is not within the field of view of the sensing devices 110', the depth value in the corresponding region of the depth map may be greater than a threshold value. In some forms, the zone module 222 may designate the voxels 101' corresponding to lower depth values as undetectable zones and those having higher depth values as detectable zones.

In some forms, the zone module 222 repeats the above routine for each combination of pose scenarios of the robots 102' and determines an aggregate undetectable zone based on the undetectable zones associated with each combination of pose scenarios. In some forms, the zone module 222 determines an aggregate detectable zone based on the detectable zones associated with each combination of pose scenarios. In some forms, the zone module 222 reduces the resolution of the depth map generated by the sensing devices 110' to reduce the noise of the depth map and minimize latency of the computing system 200. Example resolution-reduction routines include, but are not limited to, a down-sampling routine.

In some forms, the objective optimization module 224 is configured to determine whether the aggregate undetectable zone satisfies one or more detection metrics. Example detection metrics include, but are not limited to: whether a size of the aggregate undetectable zone satisfies a size criteria (e.g., the aggregate undetectable zone is at a Pareto optimal state, an area or cross-sectional area of the aggregate undetectable zone is less than a threshold area, a volume of the aggregate undetectable zone is less than a threshold volume, a relative area and/or volume of the aggregate undetectable zone is less than a threshold area and/or volume, among others); a location criteria (e.g., whether the aggregate undetectable zone is located near a location in which a human may be positioned during operation of the corresponding robot 102, whether the aggregate undetectable zone is located near a location in which at least a portion of the automated tasks of the corresponding robot 102 occur, among others); and/or number of sensors (e.g., adding one or more sensors to areas that are undetectable and should be monitored, reducing number of sensors when the one or more sensing devices 110 have overlapping field of view, among others).

In one form, to determine whether the aggregate undetectable zone satisfies one or more detection metrics, the objective optimization module 224 solves one or more multi-objective relations using a multi-objective optimization method, such as a Pareto efficient global optimization (ParEGO) algorithm, a non-dominated sorting genetic algorithm II (NSGA-II), a multi-objective evolutionary algorithm based on decomposition (MOEA-D), among others. In one form, the objective optimization module 224 determines whether the solved multi-objective relations are Pareto optimal solutions for one or more robot tasks of the robots 102, as shown in the below example relations:

$$\text{maximize } f_1(x) = C(x, PCD_1), \quad (1)$$

$$\text{maximize } f_2(x) = \sqcup_{k=2}^{N} C^{(k)}(x, PCD_k), \quad (2)$$

$$\text{subject to } G_i = 1, i \in [1, N] \quad (3)$$

$$\text{subject to } x_i^{min} \le x_i \le x_i^{max}, i \in [1, M] \quad (4)$$

In the above relations, $f_1(x)$ represents one of the detectable zones corresponding to one combination of pose scenarios ($PCD_1$), $f_2(x)$ represents the aggregate detectable area represented as a worst-case aggregate function that evaluates a worst case value for K pose scenarios ($PCD_k$), C represents a ratio of the detectable zones and the undetectable zones, x represents a position and orientation of the sensing devices 110', N represents an upper bound of the design variable, $G_i$ is a constraint related to a coverage ratio of a given voxel 101' (e.g., a voxel 101' that should always be in a detectable zone and have a value of 1), and M is a number of sensing devices 110. It should be understood that the multi-objective relations may have other constraints in some forms. As such, the objective optimization module 224 determines the solved multi-objective relations are Pareto optimal solutions and is in a Pareto optimal state if the ratio of the detectable zones and the undetectable zones (C) is greater than a threshold value and the constraint related to a coverage ratio of a given voxel 101' (G) is satisfied (e.g., $G_i = 1$).

While the objective optimization module 224 is described as performing a multi-objective optimization routine, it should be understood that the objective optimization module 224 may perform various optimization routines for identifying an optimal sensor layout and is not limited to the examples described herein. As an example, the objective optimization module 224 may identify a sensor layout that minimizes undetectable zones located near a location in which a human may be positioned during operation of the corresponding robot 102.

When the objective optimization module 224 identifies a sensor layout that corresponds to the Pareto optimal state, the sensor placement module 226 broadcasts a command to the sensing devices 110 and the transport system 120 to selectively position at least a set of the sensing devices 110 based on the identified sensor layout. As an example, the sensor placement module 226 broadcasts a command to move the set of sensing devices 110 along and/or using the transport system 120 such that the position of the set of sensing devices 110 corresponds to the identified sensor layout. As another example, the sensor placement module 226 broadcasts a command to the set of sensing devices 110 to rotate, using the actuators 114, the sensing devices 110 such that the orientation thereof corresponds to the identified sensor layout.

In an example application and prior to the robots 102 performing the automated tasks, the objective optimization module 224 identifies a nominal sensor layout of the sensing devices 110 for an expected/normal operation state of the robots 102, the sensing devices 110, the transport system 120, static objects located within the workspace 100, and/or moveable objects within the workspace 100 (collectively referred to as "workspace components"). The sensor placement module 226 then broadcasts a command to move the set of sensing devices 110 along and/or using the transport system 120 such that the position of the set of sensing devices 110 corresponds to the nominal sensor layout. When the position of the set of sensing devices 110 corresponds to the nominal sensor layout, the computing system 200 broadcasts a command to the robots 102 to begin performing the corresponding automated tasks. When an operation state of a workspace component deviates from the expected/normal operation (e.g., an operational failure of at least one of the robots 102, the sensing devices 110, and the transport system 120, a new AGV/AMR entering the workspace 100, among others), the computing system 200 broadcasts a command to the robots 102 to stop performing the corresponding automated tasks. The objective optimization module 224 then identifies a new sensor layout based on the deviation from the expected/normal operation, and the sensor placement module 226 broadcasts a command to move a set of sensing devices 110 along and/or using the transport system 120 such that the position of the set of sensing devices 110 corresponds to the new sensor layout. As such, the set of sensing devices 110 may move between the new sensor layout(s) and the nominal sensor layout based on the operation state of the workspace components.

Figure 5:
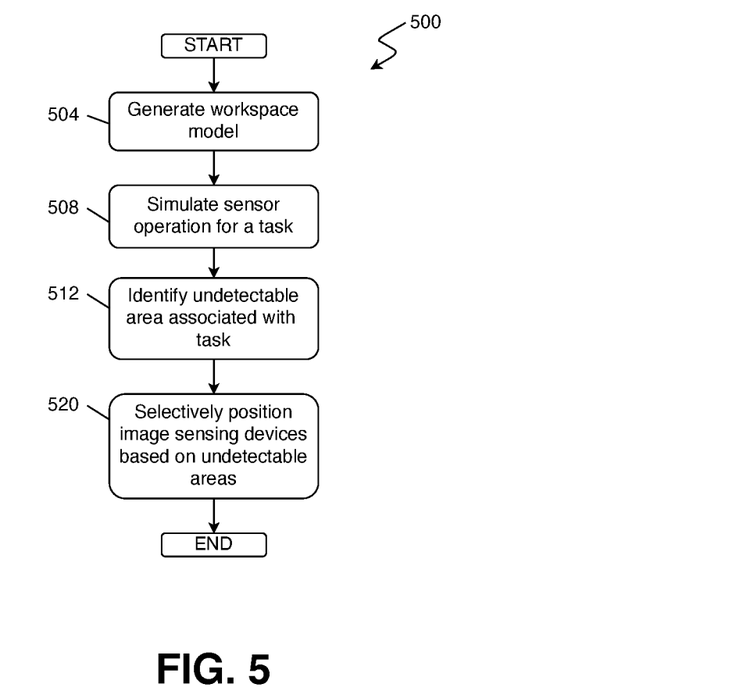
FIG. 5 illustrates an example control routine in accordance with the teachings of the present disclosure.

Referring to FIG. 5, an example simulation routine 500 is provided, and the simulation routine 500 is performed by the computing system 200. At 504, the computing system 200 generates the voxelization 100' having one or more robots 102', one or more sensing devices 110', and one or more transport systems 120'. At 508, the computing system 200 simulates, for a given task, a sensor operation of the sensing devices 110' based on the sensor characteristics and identifies an undetectable area within the voxelization 100' based on the simulated sensor operation. At 512, the computing system 200 identifies an undetectable area associated with each defined task and selectively positions the sensing devices 110 based on the undetectable areas, at 520. As an example, the computing system 200 broadcasts a command to move and/or rotate at least a set of the sensing devices 110' such that a Pareto optimal state is achieved. It should be readily understood that the simulation routine 500 is just an example routine performed by the computing system 200 and other routines may be implemented.

Accordingly, the computing system 200 described herein optimizes sensor coverage of the workspace 100 based on the undetectable areas associated with each task and broadcasts commands to adjust a position and/or orientation of the sensing devices 110 based on the undetectable areas. As such, the computing system 200 can reduce undetectable areas (both current and future undetectable areas) that may arise with dynamic events associated with the workspace 100. Dynamic events may include, but are not limited to: the introduction and/or reconfiguration of parts, robots, workpieces, and/or fixtures of the workspace; a robot malfunction in the workspace that renders one or more robots inoperable; and/or deviations from defined work process instructions.

As an example, when one of the robots 102 is inoperable for a period of time due to a fault, a new undetectable area may arise based on the inoperable robot 102. As such, when an operator defines new robot tasks for the remaining robots 102, the computing system 200 may identify a new sensor configuration that satisfies the Pareto optimal state and broadcast a command to the sensing devices 110 and/or the transport system 120 to position the sensing devices 110 in accordance with the updated sensor configuration. Furthermore, when the inoperable robot 102 is serviced by an operator and thus operable to perform the corresponding automated tasks, the computing system 200 may broadcast a command to the sensing devices 110 and/or the transport system 120 to position the sensing devices 110 in accordance with the previous sensor configuration. As another example, when a workspace component (e.g., parts, robots 102, AGVs/AMRs, or fixtures) is introduced into and/or moved within the workspace 100, a new undetectable area may arise. As such, the computing system 200 may identify a new sensor configuration that satisfies the Pareto optimal state based on the updated workspace 100 and broadcast a command to the sensing devices 110 and/or the transport system 120 to position the sensing devices 110 in accordance with the updated sensor configuration. Furthermore, if the workspace component exits the workspace 100, the computing system 200 may broadcast a command to the sensing devices 110 and/or the transport system 120 to position the sensing devices 110 in accordance with the previous sensor configuration.

As an additional example, a sensor layout may be provided to reduce undetectable areas associated with a given set of work process instructions of a given workspace 100, which may include loading a workpiece onto a fixture, machining the workpiece using the robots 102, unloading the finished workpiece from the fixture, and loading the finished workpiece onto an AGV. When the operator performs one of the work process instructions incorrectly, such as entering into an undetectable area of the workspace 100, the computing system 200 may identify a new sensor configuration that detects the current undetectable area and broadcast a command to the sensing devices 110 and/or the transport system 120 to position the sensing devices 110 in accordance with the updated sensor configuration.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for controlling a position of one or more sensors of a workspace including one or more robots, the method comprising:
   generating a workspace model having one or more digital robots, one or more digital sensors, and a digital transport system, wherein the workspace model is a digital model of the workspace, the one or more digital robots are digital models of the one or more robots, and the one or more digital sensors are digital models of the one or more sensors;
   simulating, for a task of the one or more digital robots, a sensor operation of the one or more digital sensors within the workspace model based on sensor characteristics of the one or more digital sensors, wherein the sensor characteristics includes an orientation of the digital sensors, a location of the digital sensors along the digital transport system, or a combination thereof;
   generating a depth map based on the simulation of the sensor operation and each of the one or more digital robots, the one or more digital sensors, and the digital transport system, wherein the depth map is generated based on a rotation of the one or more digital sensors, a translation matrix of each of the one or more digital sensors, or a combination thereof;
   identifying, an undetectable area within the workspace model based on the simulated sensor operation and the generation of the depth map, wherein the identification of the undetectable area is based on the task; and
   selectively positioning, based on an aggregate ratio being greater than a threshold aggregate ratio and a coverage ratio associated with each of the undetectable areas being less than a threshold coverage ratio, a set of sensors from among the one or more sensors based on the undetectable areas associated with the task.

2. The method of claim 1, wherein selectively positioning the set of sensors further comprises moving the set of sensors along the transport system.

3. The method of claim 1, wherein selectively positioning the set of sensors further comprises rotating the set of sensors.

4. The method of claim 3, wherein:
   the workspace further comprises one or more actuators attached to the set of sensors; and
   the one or more actuators are configured to rotate the set of sensors.

5. The method of claim 1 further comprising determining the aggregate undetectable area based on the undetectable areas associated with the task.

6. The method of claim 5, wherein the aggregate ratio is based on an aggregate detectable area and an aggregate undetectable area.

7. The method of claim 5 further comprising determining whether the aggregate undetectable area corresponds to a Pareto optimal state.

8. The method of claim 7, wherein the set of sensors are selectively positioned such that the undetectable area corresponds to the Pareto optimal state.

9. The method of claim 1, wherein the undetectable area within the workspace model is identified based on a plurality of voxels representing the workspace model.

10. The method of claim 9, wherein the undetectable area within the workspace model is determined based on one or more values of the depth map, and wherein each of the one or more values of the depth map is associated with one of the plurality of voxels.

11. The method of claim 10, wherein the undetectable area within the workspace model is determined in response to the one or more values of the depth map being less than a threshold depth value.

12. The method of claim 1 further comprising:
   determining the aggregate undetectable area based on the undetectable areas associated with the task; and
   determining whether the aggregate undetectable area satisfies a detection metric based on a multi-objective optimization routine, wherein the set of sensors are selectively positioned along the transport system in response to the aggregate undetectable area not satisfying the detection metric.

13. The method of claim 1, wherein the transport system is configured to move the set of sensors in a two-dimensional space of the workspace, a three-dimensional space of the workspace, or a combination thereof.

14. A system for controlling a position of one or more sensors of a workspace including one or more robots, the system comprising:
   a processor; and
   a nontransitory computer-readable medium including instructions that are executable by the processor, wherein the instructions include:
     generating a workspace model having one or more digital robots, one or more digital sensors, and a digital transport system, wherein the workspace model is a digital model of the workspace, the one or more digital robots are digital models of the one or more robots, and the one or more digital sensors are digital models of the one or more sensors;
     simulating, for a task of the one or more digital robots, a sensor operation of the one or more digital sensors within the workspace model based on sensor characteristics of the one or more digital sensors, wherein the sensor characteristics includes an orientation of the digital sensors, a location of the digital sensors along the digital transport system, or a combination thereof;
     generating a depth map based on the simulation of the sensor operation and each of the one or more digital robots, the one or more digital sensors, and the digital transport system, wherein the depth map is generated based on a rotation of the one or more digital sensors, a translation matrix of each of the one or more digital sensors, or a combination thereof;
     identifying, an undetectable area within the workspace model based on the simulated sensor operation and the generation of the depth map, wherein the identification of the undetectable area is based on the task; and
     broadcasting a command to selectively position, by a transport system, a set of sensors from among the one or more sensors based on an aggregate ratio being greater than a threshold aggregate ratio and a coverage ratio associated with each of the undetectable areas being less than a threshold coverage ratio, wherein the one or more sensors are operatively coupled to the transport system.

15. The system of claim 14, wherein the instructions further comprise:
determining the aggregate undetectable area based on the undetectable areas associated with the task;
determining whether the aggregate undetectable area corresponds to a Pareto optimal state; and
broadcasting a command to move the set of sensors such that the undetectable area corresponds to the Pareto optimal state.

16. The system of claim 14, wherein the instructions further comprise:
determining the aggregate undetectable area based on the undetectable areas associated with the task;
determining whether the aggregate undetectable area satisfies a detection metric based on a multi-objective optimization routine; and
broadcasting a command to move the set of sensors along the transport system in response to the aggregate undetectable area not satisfying the detection metric.

17. The system of claim 14, wherein selectively positioning the set of sensors further comprises moving the set of sensors along the transport system, rotating the set of sensors, or a combination thereof.

18. The system of claim 17, wherein the set of sensors are rotated using one or more actuators attached to the set of sensors.

19. The system of claim 14, wherein the transport system is configured to move the set of sensors in a two-dimensional space of the workspace, a three-dimensional space of the workspace, or a combination thereof.

20. A method for controlling a position of one or more sensors of a workspace including one or more robots, the method comprising:
generating a workspace model having one or more digital robots, one or more digital sensors, and a digital transport system, wherein the workspace model is a digital model of the workspace, wherein the one or more digital robots are digital models of the one or more robots, and wherein the one or more digital sensors are digital models of the one or more sensors;
defining one or more tasks of the one or more digital robots;
defining sensor characteristics of the one or more digital sensors, wherein the sensor characteristics includes an orientation of the digital sensors, a location of the digital sensors along the digital transport system, or a combination thereof;
for each of the one or more tasks:
simulating a sensor operation of the one or more digital sensors within the workspace model based on the sensor characteristics;
generating a depth map based on the simulation of the sensor operation and each of the one or more digital robots, the one or more digital sensors, and the digital transport system, wherein the depth map is generated based on a rotation of the one or more digital sensors, a translation matrix of each of the one or more digital sensors, or a combination thereof;
identifying an undetectable area within the workspace model based on the simulated sensor operation and the generation of the depth map, wherein the identification of the undetectable area is based on the task;
determining an aggregate undetectable area based on the undetectable areas associated with each of the one or more tasks; and
determining whether the aggregate undetectable area satisfies a detection metric based on a multi-objective optimization routine; and
selectively positioning, based on an aggregate ratio being greater than a threshold aggregate ratio and a coverage ratio associated with each of the undetectable areas being less than a threshold coverage ratio, a set of sensors from among the one or more sensors in response to the aggregate undetectable area not satisfying the detection metric, wherein the one or more sensors are operatively coupled to the transport system.

* * * * *